(12) United States Patent
Freisthler

(10) Patent No.: US 11,068,988 B2
(45) Date of Patent: Jul. 20, 2021

(54) INVESTOR KNOWLEDGE WEB

(71) Applicant: TD Ameritrade IP Company, Inc., Omaha, NE (US)

(72) Inventor: Jeffrey Michael Freisthler, Ann Arbor, MI (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 17/022,278

(22) Filed: Sep. 16, 2020

(65) Prior Publication Data
US 2020/0410599 A1   Dec. 31, 2020

Related U.S. Application Data

(63) Continuation of application No. PCT/US2020/016835, filed on Feb. 5, 2020.
(Continued)

(51) Int. Cl.
*G06Q 40/06* (2012.01)
*G06F 40/30* (2020.01)
(Continued)

(52) U.S. Cl.
CPC ......... *G06Q 40/06* (2013.01); *G06F 3/04842* (2013.01); *G06F 40/30* (2020.01);
(Continued)

(58) Field of Classification Search
CPC combination set(s) only.
See application file for complete search history.

(56) References Cited

U.S. PATENT DOCUMENTS 10,474,339 B2 * 11/2019 Dayan ............... G06Q 40/04
10,706,473 B2 *  7/2020 Vaidyanathan ...... G06Q 40/06
(Continued)

FOREIGN PATENT DOCUMENTS

KR     20170005985 A    1/2017

OTHER PUBLICATIONS

International Search Report and Written Opinion of the International Searching Authority for International Patent App. No. PCT/US2020/016835, dated Jun. 9, 2020.

*Primary Examiner* — Hien L Duong
(74) *Attorney, Agent, or Firm* — Harness, Dickey & Pierce, P.L.C.

(57) ABSTRACT

A system includes a topic subsystem module, a portfolio subsystem module, a performance subsystem module, a server, and a client device. The topic subsystem module acquires and stores artifact data relative to a first predetermined period having user-defined start and end. The topic subsystem module extracts topics related to preselected data. The portfolio subsystem module stores data regarding asset positions in a financial portfolio and the performance of each position over a second predetermined period having user-defined start and end. The performance subsystem module is configured to generate performance metrics for aggregate categories over a third predetermined period having user-defined start and end. The server generates relevancy relationships between the respective artifact data, asset positions, and performance metrics. The client receives the relevancy data and displays, on a graphical user interface, a knowledge web relating individual components of the relevancy data.

22 Claims, 12 Drawing Sheets

Related U.S. Application Data

(60) Provisional application No. 62/801,286, filed on Feb. 5, 2019.

(51) Int. Cl.
*G06F 3/0484* (2013.01)
*G06Q 40/04* (2012.01)
*G06F 3/0482* (2013.01)
*H04L 29/06* (2006.01)

(52) U.S. Cl.
CPC .......... *G06Q 40/04* (2013.01); *G06F 3/0482* (2013.01); *H04L 67/42* (2013.01)

(56) References Cited

U.S. PATENT DOCUMENTS

| | | |
|---|---|---|
| 2008/0114878 A1 | 5/2008 | Gopalkrishnan et al. |
| 2008/0235154 A1 | 9/2008 | Jones et al. |
| 2008/0270458 A1* | 10/2008 | Gvelesiani ............ G06F 16/287 |
| 2012/0150768 A1 | 6/2012 | Kotelba |
| 2014/0278958 A1 | 9/2014 | Nukala et al. |
| 2019/0018904 A1* | 1/2019 | Russell ............. G06F 16/24578 |
| 2019/0303395 A1* | 10/2019 | Flood ................... G06F 16/355 |
| 2020/0143476 A1* | 5/2020 | Sandhu ................... H04L 67/40 |

* cited by examiner

Topic: Venezuela
Impacted Sectors
1. Energy
2. Industrials
3. Financials

Most Impacted Portfolios
- Freisthler
- Shelton
- Webster

Relevant News

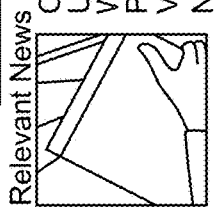

Oil sanctions. Deadly Viol
USA Today - 3 hours ago
Washington - The Trump
President Nicholas Madur
Venezuela's Maduro offer
NBCNews.com - 5 hours
Canada Is Complicit in Venezuela's US-B
International - Venezuelanalysis.com - J
Venezuelan opposition leader calls for pr
In-Depth - Washington Post - 1 hours ag
Opinion: Foreign Forces Did Not Start Ve
Opinion - NPR - 3 hours ago
'Serious consequences,' US warns, after
In-Depth - Reuters - 16 hours ago
View all

Venezuela's Guaido leaps
Associated Press (press r
CARACAS, Venezuela (A
the U.S-backed, self-decla
Venezuela's Political Crisi
Time - Jan 26, 2019

*FIG. 2B*

Topic: Venezuela
Impacted Sectors
1. Energy
2. Industrials
3. Financials
Most Impacted Portfolios
• Freisthler
• Shelton
• Webster

310

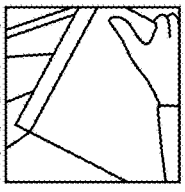

Relevant News
Oil sanctions. Deadly Viol
USA Today - 3 hours ago
Washington - The Trump
President Nicholas Madur
Venezuela's Maduro offer
NBCNews.com - 5 hours
Canada Is Complicit in Venezuela's US-
International - Venezuelanalysis.com - J
Venezuelan opposition leader calls for pr
In-Depth - Washington Post - 1 hours ag
Opinion: Foreign Forces Did Not Start V
Opinion - NPR - 3 hours ago
'Serious consequences,' US warns, after
In-Depth - Reuters - 16 hours ago
View all

Venezuela's Guaido leaps
Associated Press (press r
CARACAS, Venezuela (A
the U.S-backed, self-decla
Venezuela's Political Crisi
Time - Jan 26, 2019

*FIG. 3B*

Topic: Venezuela

⎶ 700

Impacted Sectors

1. Energy
2. Industrials
3. Financials

Most Impacted Portfolios

- <u>Freisthler</u>
- <u>Shelton</u>
- <u>Webster</u>

Relevant News

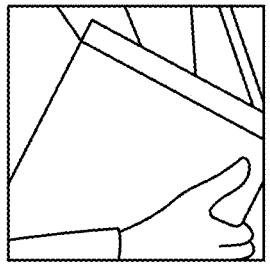

Oil sanctions. Deadly Vio
USA Today - 3 hours ago
Washington - The Trump
President Nicholas Madu Venezuela's Maduro offe
NBCNews.com - 5 hours
Canada is Complicit in Venezuela's US-Bac
International - Venezuelanalysis.com - Jan 2

Venezuelan opposition leader calls for prote
In-Depth - Washington Post - 1 hours ago Opinion: Foreign Forces Did Not Start Vene
Opinion - NPR - 3 hours ago Serious consequences; US warns, after Ven
In-Depth - ReuterS - 16 hours ago View all

Venezuela's Guaido leap
Associated Press (press
Caracas Venezuela (AP)

FIG. 7

INVESTOR KNOWLEDGE WEB

CROSS-REFERENCE TO RELATED APPLICATIONS

This application is a Continuation of International Application No. PCT/US2020/016835, filed Feb. 5, 2020, which claims the benefit of U.S. Provisional Application No. 62/801,286, filed Feb. 5, 2019. The disclosures of the applications referenced above are incorporated by reference in their entirety.

FIELD

The present disclosure relates to systems and methods for a user interface and, more particularly, to a user interface providing visual representations of relations between external factors and a financial portfolio.

BACKGROUND

In the financial services industry, advisors and clients may be presented with an extensive amount of data that impacts a particular asset or an entire portfolio. Typically, such data and the relationships between the data and the particular asset or portfolio is presented in tables or graphs that present challenges to making associations between the data and the instrument or portfolio. Further, the aggregation of data presents more associations between the aggregated data and the asset, further complicating making logical decisions based on the associations.

Advisors and clients are typically busy and have limited time. Deciding on particular trades of assets or the composition of a portfolio can be very time consuming given the current data presentation approaches. Advisors and clients find themselves wanting to initiate transactions or structure their portfolios, but can be overwhelmed by the multiple associations with no tools to facilitate the decision making process. Present systems do not facilitate efficiently selecting the purchase or sale of instruments based on the available data.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a topic subsystem module. The topic subsystem module acquires and stores artifact data relative to a first predetermined period. The topic subsystem module extracts topics related to preselected data. The system further includes a portfolio subsystem module. The portfolio subsystem module stores data regarding asset positions in a financial portfolio and the performance of each position over a second predetermined period. The performance subsystem module generates performance metrics for aggregate categories over a third predetermined time frame. The system further includes a server. The server receives data from the topic subsystem module, the portfolio subsystem module, and the performance subsystem module. The server generates relevancy relationships between the respective artifact data, asset positions, and performance metrics. The server further includes a client device. The client receives the relevancy data and displays on a graphical user interface a knowledge web relating individual components of the relevancy data. The knowledge web includes a plurality of nodes, and the plurality of nodes include at least a plurality of portfolios, sectors, topics, and news, and the selected ones of the plurality of nodes are interconnected to selected others of the plurality of nodes.

A method acquires and stores artifact data relative to a first predetermined period, and extracting topics related to preselected data. The method stores data regarding asset positions in a financial portfolio and the performance of each position over a second predetermined period. The method generates performance metrics for aggregate categories over a third predetermined time frame. The method receives the artifact data, the asset positions data, and the performance metrics and generates relevancy relationships between the respective artifact data, asset position data, and performance metrics. The method receives the relevancy data and displays on a graphical user interface a knowledge web relating individual components of the relevancy data. The knowledge web includes a plurality of nodes, and the plurality of nodes include at least a plurality of portfolios, sectors, topics, and news, and the selected ones of the plurality of nodes are interconnected to selected others of the plurality of nodes.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 2A and 2B are an example screen of a user interface including an investor knowledge web arranged in accordance with the principles of the present disclosure;

FIGS. 3A and 3B are another example screen of a user interface including an investor knowledge web arranged in accordance with the principles of the present disclosure;

FIG. 7 depicts a portion of the user interface of the investor knowledge web for providing additional information to the user;

In the drawings, reference numbers may be reused to identify similar and/or identical elements.

DETAILED DESCRIPTION

Figure 1:
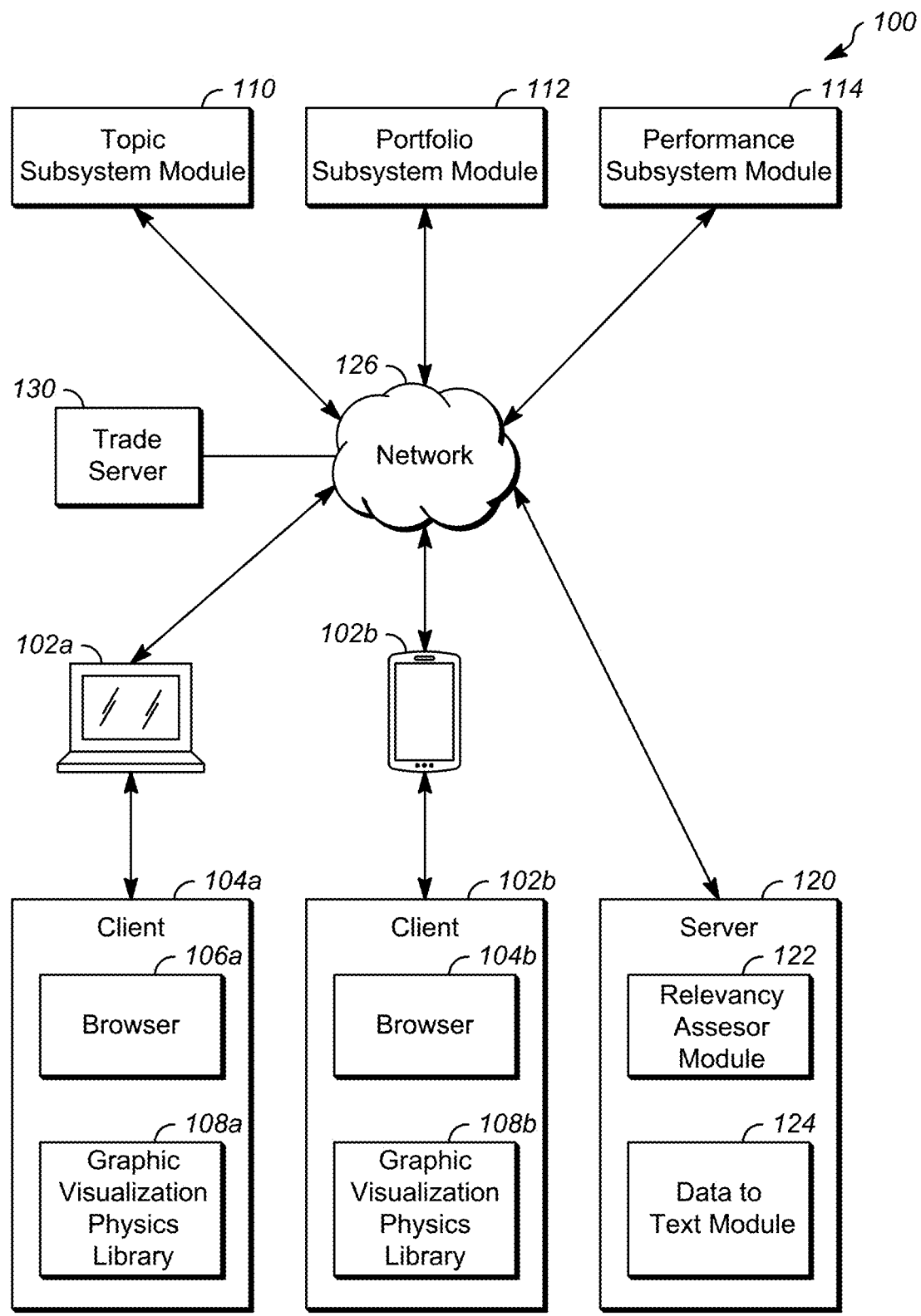
FIG. 1 is a block diagram of an example investor knowledge web system according to the principals of the present disclosure.
Figure 2A:
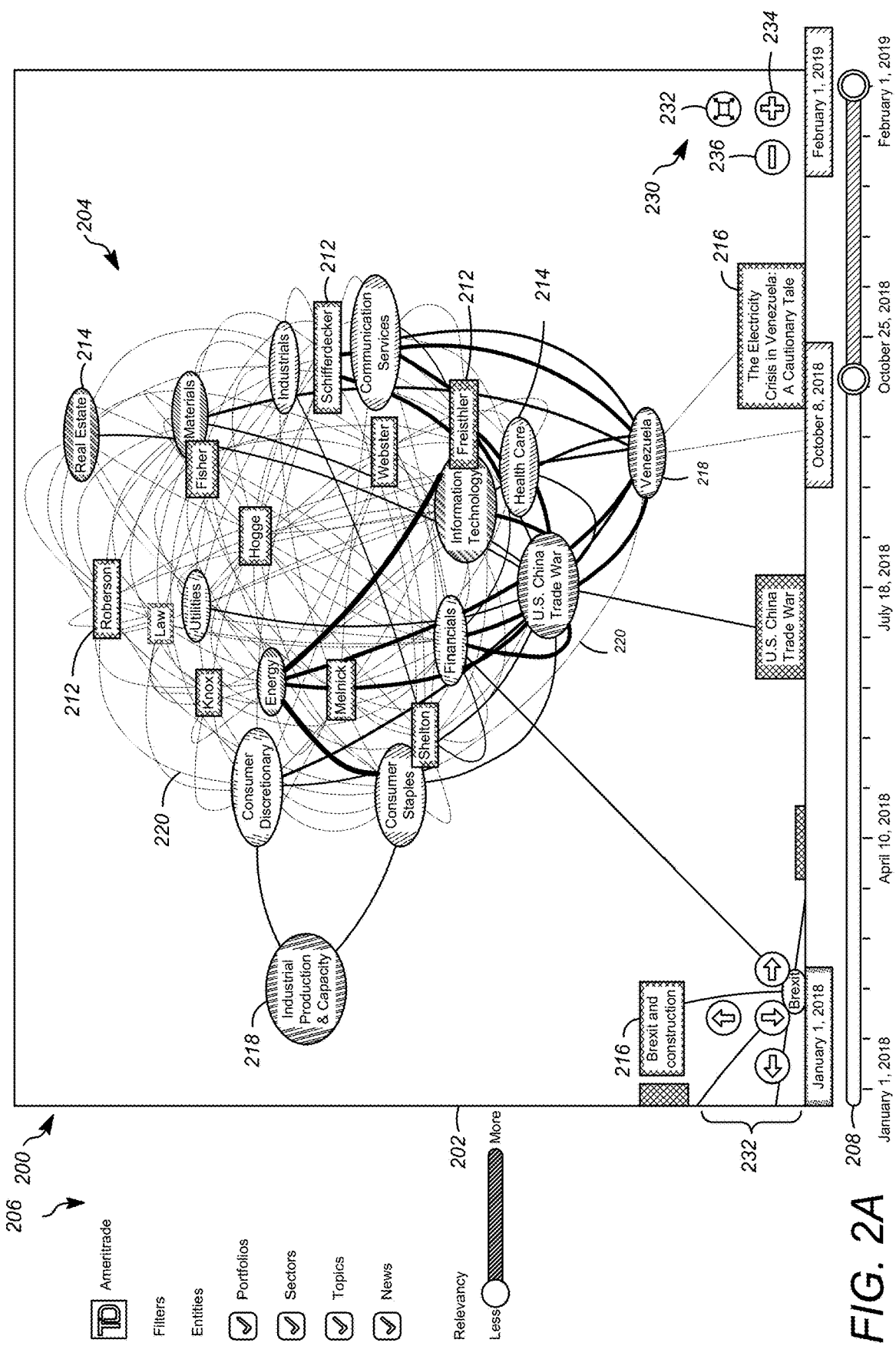
Figure 3A:
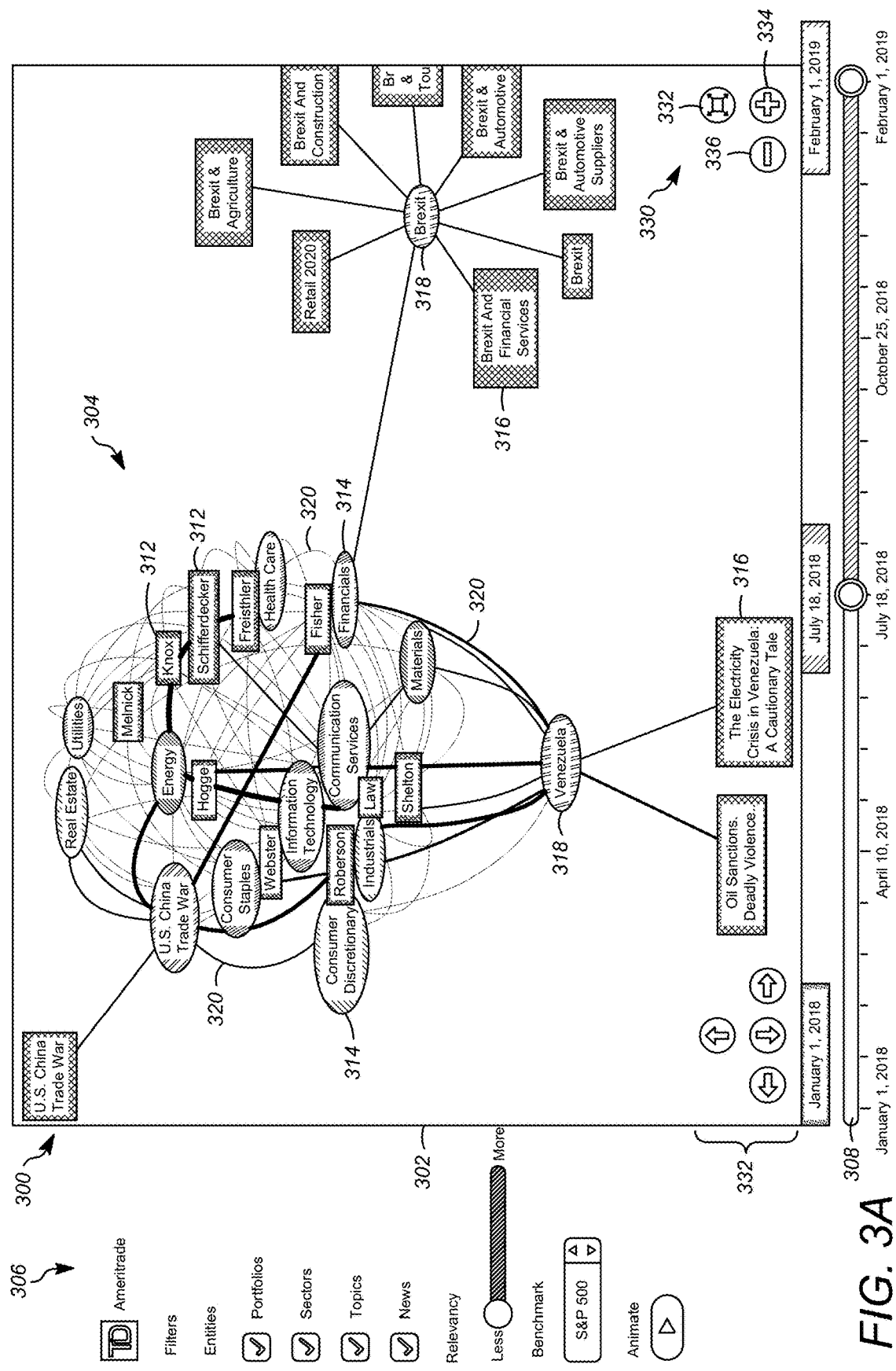

Financial advisors often manage many client portfolios and generate reports in order to explain decisions made on the shift of allocations from one asset allocation to another based on market conditions.

The typical approach involves research from various financial analysts and packaging it in a tabular report to their clients so they may understanding the decision-making made when shifting investments in their portfolio as well as exposure to trends. The current structure of these research digests are lengthy narratives established by experts in the field. Direct correlation between global events and impact to individual portfolios are typically assessed by an individual advisor and the degree of relevancy is rarely included as part of the information organized for delivery in a client consultation. In addition, tools provided to a financial advisor to evaluate impact to investment portfolios under their management tend to be ad-hoc analysis tools that require some inherent insight into current trends in order to identify the relevant impact to their managed portfolios.

The investor knowledge web system described herein generates a set of associations between contemporary topics and their weighted relevancy to their impact on one or more investment portfolios. The investor knowledge web provides a means to quickly assess the weighted impact of topics to one or more investment portfolios. The investor knowledge web system provides an advisor with a way to quickly analyze a portfolio's exposure to relevant topics as well as provide a way to educate clients on that exposure. Use of a graph provides a concise representation of topics to their impact on investment allocations and aides in faster interpretation of risk exposure.

In a typical graphical user interface, a knowledge web displays the interrelation between various topics, subjects, and classifications. Bubbles containing text or images are connected to one another by lines to indicate the intensity or relevancy of the relationship between the topics. The size of the text, images, lines, or color may be modified to indicate the intensity or relevancy of the relationship. The knowledge web provides a visual summary of an information space that allows a user to identify relationships or trends and take action on the conclusion. In a non-limiting embodiment, an investor knowledge web displays a representation of the various news, topics, classifications, and portfolios relevant to an investor and the relationships between these entities. An example user interface including an investor knowledge web is shown in the attached Figures.

The knowledge web is formed by aggregating various inputs and relating them to identify common topics. A number of known methods may be used to analyze documents in order to extract the common topics used in the knowledge web. A combination of document clustering and topic modeling methods may be used to generate the topics to be represented in the knowledge web. Example inputs to the knowledge web include:

Any document that discusses impact to a company or classification of a company (e.g., industry sector, asset class). This includes, but is not limited to, news articles, quarterly earnings reports, and sector analysis reports.

Investor portfolio information, which may include specific portfolio and corresponding account positions, or just a proxy representation based on the classifications being used and the asset values allocated to those classifications.

A time period, wherein a selected time period may be used to restrict the documents being used to generate the knowledge web.

Desired entities, which may be those entities and associated relationships to be shown in the knowledge web.

Relevancy, wherein one or more selectors may allow for isolation of portions of the knowledge web that are most relevant to a user. This may be a single selector that impacts the entire visual, or a number of selectors that have specific relevancy meaning based on the type of relationship being examined. For example, the selector to adjust relevancy of topics to industry sector may work independent of selectors to adjust relevancy of sectors to portfolios.

A basic illustration of a set of controls for managing inputs for desired entities and relevancy filtering is shown in FIGS. 2A, 2B, 3A, 3B, 5, and 6. As will be described in greater detail, the depicted slider may establish a relevancy threshold, such that the slider bar establishes a minimum threshold of relevancy—then, only items (such as entities or relationships) more relevant than the minimum threshold are displayed. In various embodiments, the slider may establish a maximum threshold of relevancy, such as when the user is exploring secondary or tertiary relationships and the most relevant relationships may represent noise.

In various embodiments, the slider may include two adjustable indicators, one establishing a minimum relevancy threshold and the other establishing a maximum relevancy threshold. In various embodiments, the two adjustable indicators are independently movable. In various embodiments, the spacing between the two adjustable indicators may be computer-determined: for example, the spacing may be fixed to a specific range of relevancy values. As another example, the spacing may dynamically change so that a predetermined number of items is shown as the slider is manipulated. For example, if a user adjusts one end of the slider, the other end may be automatically repositioned to render visible a predetermined number of items.

FIG. 1 depicts an example knowledge web system 100. Knowledge web system 100 includes user devices or input devices 102a, 102b, collectively referred to as input device 102, which may be portable devices such as a smart phone or tablet 102a or a computer or laptop 102b. Each input device implements a respective client 104a, 104b, collectively referred to as client 104. Each client 104 includes a respective browser 106a, 106b and a respective graphic visualization physics library 108a, 108b, as will be described in greater detail herein.

Knowledge web system 100 includes a topic subsystem module 110, a portfolio subsystem module 112, and a performance subsystem module 114, as will be described in greater detail herein. Knowledge web system 100 also includes a server 120. Server 120 includes a relevancy assessor module 122 and a data to text module 124.

In various embodiments, the elements of knowledge web system 100 communicate via network 126. The various elements of knowledge web system 100, communicate with network 126 either directly, or connect through an intermediate element, including via a cloud, Internet, or intranet. In various embodiments, knowledge web system 100 includes a trade server 130. Trade server 130 executes trades in accordance with input from clients 104a, 104b. Trade server 130 may execute trades in accordance with user-initiated input or in response to various rational relationships between the nodes and edges of a respective knowledge web graph.

FIGS. 2A, 2B and 3A, 3B depict graphical user interfaces 200, 300 according various embodiments of the present disclosure. Graphical user interfaces 200, 300 include knowledge web frames 202, 302 depicting respective knowledge webs 204, 304, as will be described in greater detail herein. Graphical user interfaces 200, 300 also include filter sections 206, 306 which enable the user to filter selected data displayed in the respective knowledge webs 204, 304. Graphical user interfaces 200, 300 also include second filter sections 208, 308 which enables the user to define a timeframe of interest for the respective knowledge webs 204, 304. Graphical user interfaces 200, 300 are also include respective information sections 210, 31,0 which provide additional information about selected elements in respective knowledge webs 204, 304.

Knowledge webs 204, 304 provide a graphical representation of selected data. The selected data comprises portfolios, sectors, topics, and news, or artifacts as will be described in greater detail herein. In various embodiments, portfolios are depicted using rectangular blocks, such as at 212, 312, respectively. In various embodiments, sectors are depicted using elliptically shaped blocks, such as at 214, 314. In various embodiments, topics are depicted using rectangular shaped blocks, such as at 216, 316. In various embodiments, news or artifacts are depicted using elliptically shaped blocks 218, 318. In various embodiments, various ones of the portfolios, sectors, topics, and news may be linked using edges, such as at 220, 320. The edges indicate a relationship between the connected selected ones of the portfolios, sectors, topics, and news.

Graphical user interfaces 200, 300 also include respective magnification sections 230, 330 and scroll sections 232, 332. Magnification sections 230, 330 include full view icons 232, 332; zoom in icons 234, 334; and zoom out icons 236, 336. Full view icons 232, 332 provide a full view of the knowledge web 204, 304, respectively, when activated by the user. By way of non-limiting example, when full view icons 232, 332 are selected by the user, respective knowledge webs 204, 304 are resized so that the entire knowledge web appears in respective frames 202, 302. Zoom-in buttons 234, 334 and zoom-out buttons 236, 336 enable the user to zoom into or out of respective knowledge webs 204, 304. Scroll sections 232, 332 include respective arrow icons UP, DOWN, LEFT, and RIGHT. When user selects the respective icons, the view within respective frames 202, 302 is shifted in the respective direction. For example, when a user selects the UP arrow, respective knowledge webs 204, 304 are shifted upward.

Figure 4:
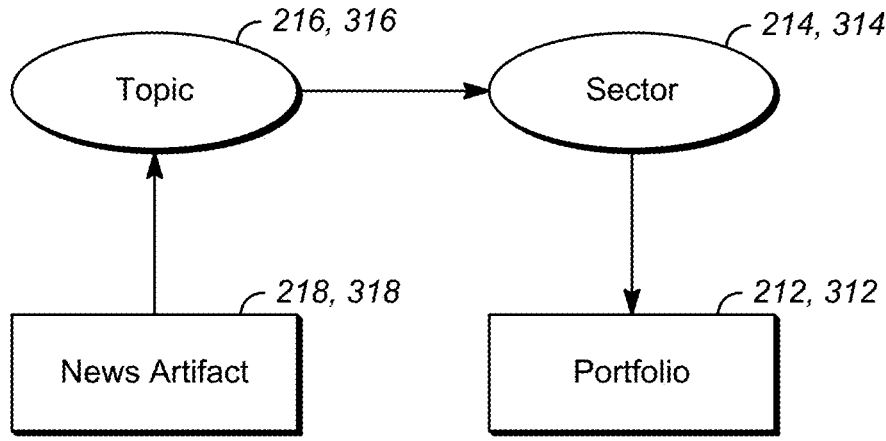
FIG. 4 is a block diagram depicting relationships between various aspects of an investor knowledge web

As described above, the basic information displayed on knowledge webs 204, 304 include at least four types of data, also referred to as nodes: news or artifact, topic, sector, and portfolio. Further as described above, edges on the graph represent a relationship between the nodes. In the knowledge webs 204, 304, there is a hierarchy of relationships. FIG. 4 depicts an example relationship such as where news or artifacts 218, 318 is related to zero or more topics 216, 316. Likewise, topics 216, 316 are related to zero or more sectors 214, 314. Likewise further, sectors 214, 314 are related to zero or more portfolios 212, 312. It should be noted that while sectors 214, 314 are shown as related to respective portfolios 212, 312 and may be used to define allocations in a portfolio, one skilled in the art will recognize that data other than sectors can be related to portfolios 212, 312. For example, asset classes, which may be defined as a grouping of similarly styled investments, growth/value instruments, geographic location, or market capitalizations can likewise be related to portfolios 212, 312. In such an instance, the symbols 214, 314 in FIGS. 2A, 2B and 3A, 3B may be refer asset classes, growth/value instruments, geographic location or market, rather than sectors.

In various embodiments, server 120 processes data received from the respective subsystem modules 110, 112, 114. Further, in various embodiments, data exchange between the respective subsystem modules 110, 112, 114 and server 120 over network 126 occurs by exchanging data in JavaScript Object Notation (j son).

In various embodiments, topic subsystem module 110 extracts topics from artifacts and stores the associations of the extracted topics to the artifacts along with weighted relevancy. In various embodiments, topic subsystem module 110 may use a conten intelligence platform such as described in U.S. application Ser. No. 16/371,063, filed Mar. 31, 2019, the entire disclosures of which is incorporated by reference herein. Given a predetermined timeframe, topic subsystem module 110 provides the topic and artifact data relevant to the timeframe. The portfolio subsystem module 112 stores data regarding positions held in a client's financial portfolio, as well as performance of each position over time. Given a predetermined timeframe, a classification type (e.g. sector, asset class, etc.), and advisor profile, the portfolio subsystem provides all of the portfolios accessible by the advisor, along with an aggregate representation of the positions using the specified classification type. Performance subsystem module 114 stores performance metrics for aggregate categories (e.g. sector, asset class, etc.), and benchmarks. Given a predetermined timeframe, a classification type, and an optional benchmark (Standard & Poor's 500, Russell, etc.) performance subsystem module 114 provides performance metrics of the classification type over the time period. If a benchmark is provided, then the performance will be that of the benchmark over the time period based on the selected classification type.

Figure 5:
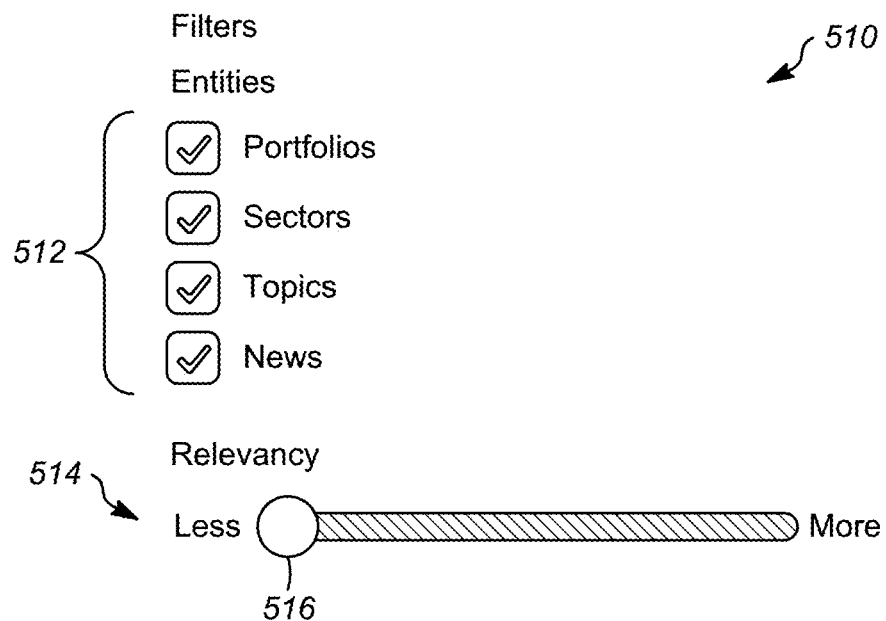
FIG. 5 depicts a portion of the user interface of the investor knowledge web for filtering data presented in the investor knowledge web.

In various embodiments, filters may be used to adjust what is presented in the visualization. By way of non-limiting example, filters may include the ability to adjust the types of nodes to display and visibility of nodes and relationships based on relevancy scores. With reference to FIG. 5, a portion of the filter sections 206, 306 is shown at filter section 510. Filter section 510 includes an entity selection portion 512 and a relevancy 514. Entity selection portion 512 provides a listing of the type of nodes, such as portfolios, sectors, topics, and news and check boxes associated with each entity. They user may select one or more checked boxes in order to determine the data displayed on the web graph such as web graphs 204, 304. Filter section 510 also includes a relevancy portion 514 which includes a slider 516 movable by the user between a left position, defining less relevant data, and a right position, defining more relevant data. As slider 516 is moved rightward, more relevant data, is displayed on the knowledge webs, such as knowledge webs 204, 304.

Figure 6:
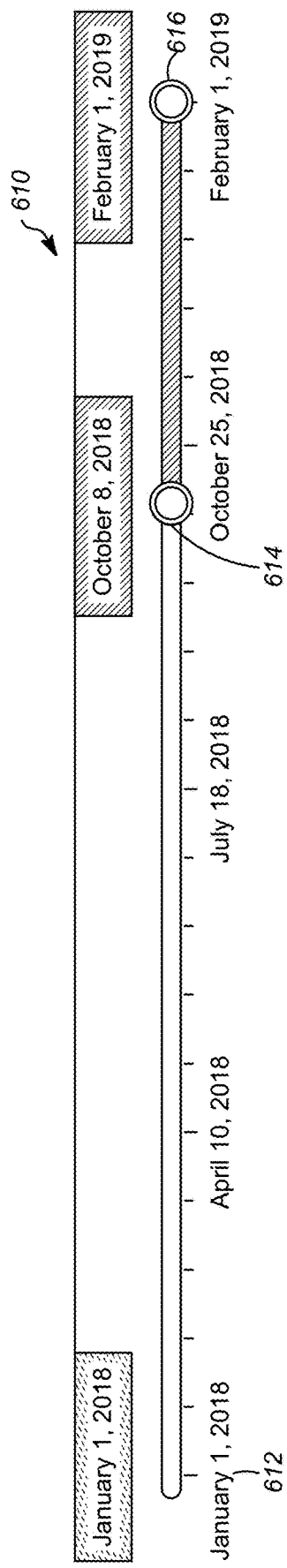
FIG. 6 depicts a portion of the user interface of the investor knowledge web for filtering dates presented in the investor knowledge web.

In various embodiments, the dates of the various portfolios, sectors, topics, and news can be filtered so that only days falling within a predetermined range are considered for generation of the web graphs, such as web graphs 204, 304. With reference to FIG. 6, a portion of the second filter sections 206, 306 is shown at date selection section 610. Date selection section 610 includes a date display bar 612. Date display bar 612 includes a pair of slider 614, 616. Slider 614 defines an earliest date within the range of date display bar 612. Slider 616 defines a latest date within the range of the date display bar 612. The user can adjust sliders 614, 616 to define a date range for the data to be displayed on web graphs 204, 304. In the embodiment of FIG. 6, the illustrated visualization uses months to segment time period. Other time segments such as year, quarter or week may be used instead.

As described above, the data for each entity may be represented as serialized data formatted using JSON. By way of non-limiting example, a topic may be embodied as serialized data. In the example below, the topics are China Trade War (id: 1) and Brexit (id: 2), respectively. With respect to the examples below, the text in double quotes is a label that indicates a date and month, and the value following the string defines the mentions for China Trade War in that month. For example, "201903_mentions":20 indicates that China Trade War was mentioned 20 times in March, 2019. The relative value indicates the weighting of the topic. For example, the relative value or weighting of the China Trade War topic is 0.1. The Brexit topic data is similarly configured, but is weighted at 0.4.

```
{
    id: 1,
    ref_id: 121212,
    type:"topic",
    label: 'China Trade War',
    "201901_mentions":0,
    "201902_mentions":12,
    "201903_mentions":20,
    "201904_mentions":4,
    "201905_mentions":8,
    "201906_mentions":14,
    "201907_mentions":30,
    "201908_mentions":40,
    "201909_mentions":43,
    "201910_mentions":50,
    "201911_mentions":43,
    "201912_mentions":41,
    "relative_value":.1
},
{
    id: 2,
    ref_id: 34343434,
    type:"topic",
    label: 'Brexit',
    "201901_mentions":0,
    "201902_mentions":2,
    "201903_mentions":10,
    "201904_mentions":8,
    "201905_mentions":13,
    "201906_mentions":24,
    "201907_mentions":34,
    "201908_mentions":46,
    "201909_mentions":55,
    "201910_mentions":67,
    "201911_mentions":78,
    "201912_mentions":88,
    "relative_value":.4},
}
```

Further, by way of non-limiting example, a portfolio may be embodied as serialized data. In the example below, the portfolios are the Smith (id: 2) and Jones (id: 21) portfolios, respectively. With respect to the examples below, the text in double quotes is a label that indicates a date and month, and the value following the string defines the value of the portfolio in that month. For example, "201904_value": 201100 indicates that value of the Smith Portfolio was valued at 201100 in April, 2019. The Jones Portfolio is similarly configured.

```
{
    id: 20,
    ref_id:"123456",
    type:"portfolio",
    label: 'Smith Portfolio',
    "201901_value":0,
    "201902_value ":200200,
    "201903_value ":201000,
    "201904_value ":201100,
    "201905_value ":201500,
    "201906_value ":201450,
    "201907_value ":201125,
    "201908_value ":201250,
    "201909_value ":202100,
    "201910_value ":202400,
    "201911_value ":202200,
    "201912_value ":203000
},
{
    id: 21,
    ref_id:"7890123",
    type:"portfolio",
    label: 'Jones Portfolio',
    "201901_value":800123,
    "201902_value ":805200,
    "201903_value ":807000,
    "201904_value ":811100,
    "201905_value ":813500,
    "201906_value ":821450,
    "201907_value ":821125,
    "201908_value ":811250,
    "201909_value ":812100,
    "201910_value ":810005,
    "201911_value ":807200,
    "201912_value ":805000
}
```

By way of non-limiting example, a sector may be embodied as serialized data. In the example below, the sectors are Information Technology (id: 9) and Energy (id: 10), respectively. With respect to the examples below, the text in double quotes is a label that indicates a date and month, and the value following the string defines the performance of that sector. For example, "201905_performance":13 indicates the performance of the Information Technology sector in May, 2019. The relative value indicates the weighting of the sector. For example, the relative value or weighting of the Information Technology sector is 0.18. The Energy sector data is similarly configured, and is also weighted at 0.18.

```
{
    id: 9,
    ref_id: "info_tech"
    type:"sector",
    label: 'Information\nTechnology',
    "201901_performance ":0,
    "201902_performance ":2,
    "201903_performance ":10,
    "201904_performance ":8,
    "201905_performance ":13,
    "201906_performance ":24,
    "201907_performance ":34,
    "201908_performance ":46,
    "201909_performance ":55,
    "201910_performance ":67,
    "201911_performance ":78,
    "201912_performance ":88,
    "relative_value":.18
},
{
    id: 10,
    ref_id: "energy"
    type:'sector',
    label:'Energy',
    "201901_performance ":0,
    "201902_performance ":2,
```

```
            "201903_performance ":10,
            "201904_performance ":8,
            "201905_performance ":13,
            "201906_performance ":24,
            "201907_performance ":34,
            "201908_performance ":46,
            "201909_performance ":55,
            "201910_performance ":67,
            "201911_performance ":78,
            "201912_performance ":88,
            "relative_value":.18
        }
```

By way of non-limiting example, artifact or news may be embodied as serialized data. In the example below, the artifact or news is Brexit and Financial Services. The serialized data record also includes a type, article, a label, Brexit and Financial Services, and a uniform resource indicator (URI), http://researchbriefings.parliament.uk/ResearchBriefing/Summary/CBP-7628, and a creation date 2019 Apr. 2.

```
{
    id: 30,
    ref_id: "article_123"
    type:"article",
    label: 'Brexit\nand \nFinancial Services',
    "uri":"http://researchbriefings.parliament.uk/ResearchBriefing/Summary/CBP-
    7628",
    "relevancy ":.09,
    "creation_date ":"20190402"
}
```

By way of non-limiting example, an edge may be embodied as serialized data. In the example below, the edge is for an artifact to topic edge and two sector to portfolio edges, the Smith Portfolio to sector edge and the Jones Portfolio to Sector edge. Each portion between brackets ({ }) indicates a from node, a to node, and a relevance, which can define a visual property of the edge. A visual property can include thickness, composition, such as dots or dashes, color, length, or any other property indicating visually information related to the edge.

```
[
            #Artifact to Topic
            {id:1, from: 2, to: 30},
            #Sector to portfolio
            //Smith Portfolio - Sectors
            {from: 20, to: 9, relevancy: .05},
            {from: 20, to: 10, relevancy: .1},
            {from: 20, to: 11, relevancy: .08},
            {from: 20, to: 12, relevancy: .001},
            {from: 20, to: 13, relevancy: .15},
            {from: 20, to: 14, relevancy: .12},
            {from: 20, to: 15, relevancy: .004},
            {from: 20, to: 16, relevancy: .11},
            {from: 20, to: 17, relevancy: .09},
            {from: 20, to: 18, relevancy: .2},
            {from: 20, to: 19, relevancy: .06},
            {from: 20, to: 15, relevancy: .035},
            //Jones Portfolio - Sectors
            {from: 21, to: 9, relevancy: .15},
            {from: 21, to: 10, relevancy: .08},
            {from: 21, to: 11, relevancy: .2},
            {from: 21, to: 12, relevancy: .004},
            {from: 21, to: 13, relevancy: .05},
            {from: 21, to: 14, relevancy: .1},
            {from: 21, to: 15, relevancy: .005},
            {from: 21, to: 16, relevancy: .09},
            {from: 21, to: 17, relevancy: .07},
            {from: 21, to: 18, relevancy: .13},
            {from: 21, to: 19, relevancy: .07},
            {from: 21, to: 15, relevancy: .051},
];
```

In various embodiments, a goal of the visualization of a knowledge web 204, 205 is to provide a way to quickly identify areas of exposure of many portfolios within an advisor's book of portfolios and to compile a narrative to better educate themselves and their clients on those local and worldly events that have the greatest impact. Various embodiments accomplish this through use of the information depicted as an interactive graph as well as a combination of visual styles (color, size, border, etc.) of the nodes and edges of the knowledge webs 204, 304. The interactive knowledge web 204, 304 also provides a means to select nodes and edges in order to drill-down into further detail. For example, a user can click on to a node or an edge in order to drill into the node or the edge. In addition, filters for the knowledge webs 204, 304, such as shown at FIGS. 5 and 6, allow for reducing information noise generated by those nodes and edges which might be considered less relevant by removing them from view. In various embodiments, elements of the visualizations are coordinated based on changes in the market, and allocations within an investment portfolio over a time period. The visualization may be animated by stringing together a series of graph representations based on a gradual shifting of subcomponents of the timeframe.

Rendering of the graph relies on the use of an existing visualization library such as D3 or vis.js to provide the framework for changes to style and to manage the physics involved in how elements in the graph are positioned relative to other elements.

In various embodiments, the color of elements within the knowledge webs 204, 304 allows for additional information to be communicated within the graph space. There is specific benefit to shading the sector and portfolio nodes in order to indicate financial performance over the selected time period, using date selection section 610. By way of non-limiting example, in order to incorporate the compounding rate of investments and reinvestment of dividends, the geometric rate of return may be used to generate the color of graph based on their performance over a time period.

In various embodiments, a node may be presented in some shade of green, demonstrating positive growth. Shades of red could be used to demonstrate negative growth. The specific shade could be based on if it is negative or positive, or it could be based on relative performance compared to the geometric return to some sort of ideal benchmark over the same time period. For example, the performance of the Standard & Poor's 500 stocks associated with the specific sector, or compared to a specific portfolio's performance.

In various embodiments, for non-financial related nodes, such as news/artifact or topic, shading may still be valuable, but would use some other means to determine what colors to use. For these nodes, a sentiment score could be used to provide additional insights into the underlying data.

In various embodiments, size is also a property that may be used to communicate additional information on relevancy of an element within the graph. By way of non-limiting example, the following provides description of each type of node and the attribute that is used for rendering the node in a way that highlights its relevancy:

News/artifact—The subjective influence of the artifact source is used to generate its size within the graph. For example, a quarterly report would be larger than a single tweet.

Topic—A combination of the occurrences of artifacts, the distinct companies reflected in the underlying artifacts, and the number of sectors impacted may be used generate a relevancy value.

Sector—Relevancy is determined by the percentage of total value represented in the associated portfolios within the graph.

Portfolio—The value of a portfolio is used to generate its size within the graph In various embodiments, the thickness of edges between nodes is based on the assessed relevancy to another node. The edges are considered directional, meaning a single direction of interaction of given node to another node is relevant. Here are descriptions of each type of relationship, represented as an edge in the graph, and the attribute that is used for rendering the edge in a way that highlights relevancy:

A news/artifact's (news, report, etc) relevancy to a topic—relevancy may be established based on standard search engine type relevancy scoring based on comparing the relative importance of the artifact with the relative importance of all other artifacts generated during the selected time frame.

A topic's relevancy to a sector—relevancy may be established based on the degree to which the companies associated with the underlying artifacts make up a given sector.

Company A: In news related to 'China Trade War', sector 1 12%, sector 2 20%, Sector 3 23%, etc.

Company B: In news related to 'China Trade War', sector 1 90%, sector 3 10%

Company C: sector 1 30%, sector 2 10%, sector 3 60%

Company D: sector 1 40%, sector 2 60%

Relevancy of sector to 'China Trade War'=(0.12+0.9)/(0.12+0.9+0.3+0.4)

A sector's relevancy to a portfolio—relevancy is established using the percentage of the portfolio's allocation to a sector. So, if 30% of a portfolio is made up of instruments related to the energy sector. The relevancy value associated with the edge connecting the Energy node with that portfolio would be 0.3.

In various embodiments, additional detail on a node, or edge may be obtained by selecting a specific node or edge. By way of non-limiting examples:

Click on topic—selecting a topic presents additional information on the various relationships the topic has with other nodes. FIG. 7 depicts an example of the type of content 700 that would be displayed, such as from information sections 210, 310 from respective FIGS. 2A, 2B and 3A, 3B.

Figure 8:
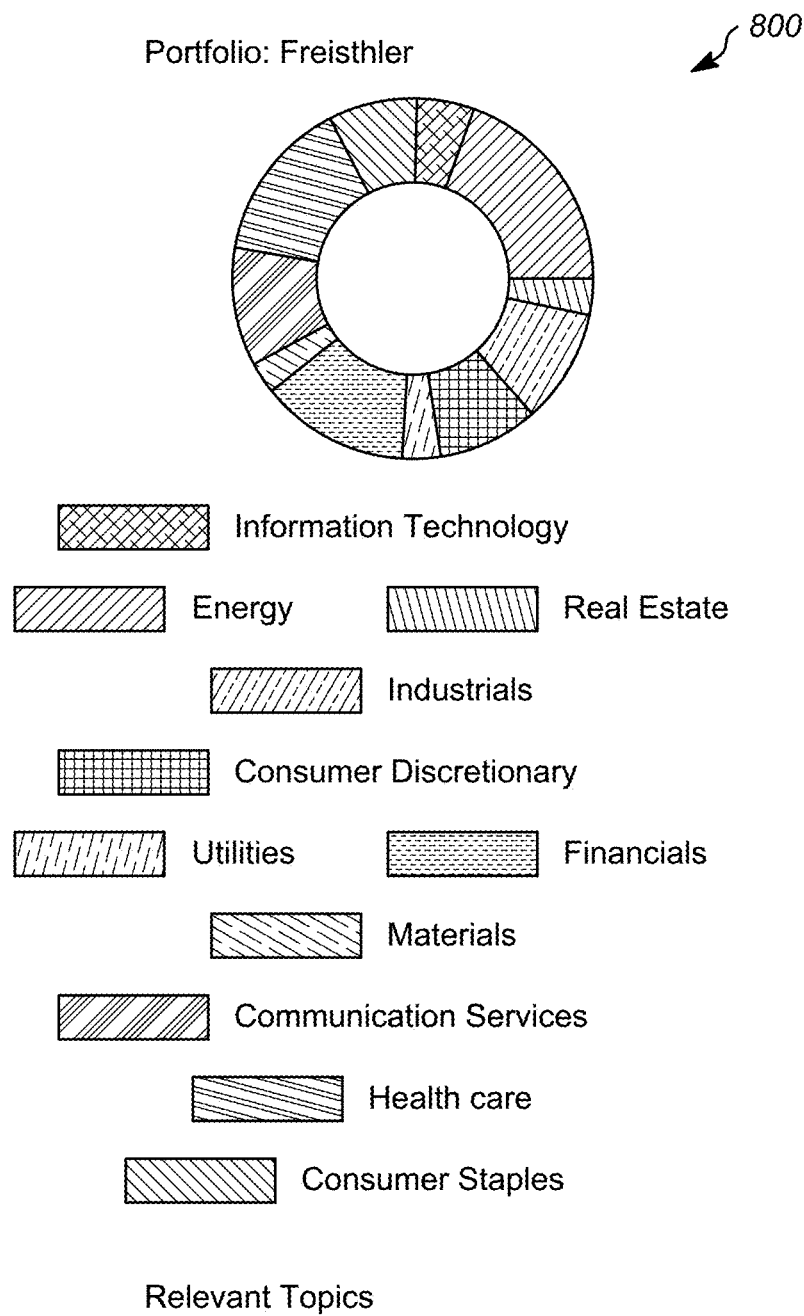
FIG. 8 depicts another portion of the user interface of the investor knowledge web for providing additional information to the user.

Click on sector—selecting a sector would present the topics that are currently impacting the sector and the portfolios that are impacted Click on portfolio—selecting a portfolio presents additional information on the portfolio. FIG. 8 depicts an example of the type of content 800 that would be displayed.

Click on news/artifact—selecting an artifact would show either a link to, or the contents of the artifact. It would also show the various topics associated with the artifact.

Click on edges—selecting an edge that represents the relationship between two nodes reveals content that shows the relevancy of the relationship, through either a type of scoring, or relative to other relationships in the graph.

Performance of sectors and portfolios over time may be rendered as an animation based on time series event data stored within the data provided by the server. In such an animation, topics and artifacts would change in style depending on their influence. For example, if an election occurred in a particular country, for example, in November that appears to significantly impact the energy sector, and the time selected for the graph is October through December, then the user will see the size of a node increase as the election nears and then reach its largest representation post-election and then see the size decrease as the end of December is reached and impact seems to wane.

The animation is rendered by processing the specific relevancy scores and intrinsic values of the nodes and edges corresponding to each sub time-frame. For example, if a full calendar year is selected, then an animation would consist of rendering the graph with Q1 data, then Q2 data, then Q3 data, and finally Q4 data.

In various embodiments, the corpus of documents to be included as the basis for generating the graph may include any natural-language based news or artifact. This includes, but is not limited to news articles, quarterly statements, tweets, and transcriptions from phone calls or recorded interviews. This corpus is organized in either a database, or on a file system in a manner that is accessible to the corpus analysis. In various embodiments, for each document of the corpus, a process parses the text and identifies any reference to known corporations, by using company names and stock symbols and known variations of such names and symbols. The list of companies associated with each document is stored in a manner for future processing to access. Once associations between companies and documents within the corpus to which they are mentioned, we are able to associate those documents to the various asset classes that each company represents. By way of non-limiting example, if General Electric were identified in one or more documents, we know that General Electric is associated with the power, renewable energy, aviation, oil & gas, healthcare, transportation, lighting, and capital investment sectors.

Given a corpus of documents (news articles, quarterly statements, etc.), clusters of the documents through standard clustering algorithms (Latent Semantic Indexing, Non-negative Matrix Factorization and Concept Factorization) are formed. Document clustering intends to organize similar documents into groups. Once these groups are formed, topic modelling algorithms (LDA, PLSA) are used to extract the group of words or topics that caused the news/artifacts to cluster together. For example, a number of documents cluster together based on the existence of the terms such as China Trade War, Venezuela Oil Crisis, or Tax Cuts. Once generated, these topics are stored so that they may be associated with the original documents so that later processing may make use of that relationship. The original documents must be stored with their creation date to allow for selection of relevant time frames later in processing.

An investment portfolio is a collection of assets owned by an individual or by an institution. An investor's portfolio may include any number of assets, such as stocks, bonds, mutual funds, money market funds and exchange traded funds. Each asset in a portfolio is associated to one or more asset classes. A portfolio may be represented as a weighted distribution of asset classes of a similar category (e.g. Morningstar sectors, style, etc.). In addition most financial advisors manage a 'book' of portfolios. The system requires access to the current and historical instruments that make up each portfolio, as well as the current and historical values of each instrument.

Relevancy score of a topic to a portfolio is based on an asset class (e.g. sector) to which a topic is associated and the degree to which a portfolio is composed of that asset class. By way of non-limiting example, if 5% of the instruments in a portfolio are associated with the energy sector. The topic of Venezuela Oil Crisis would be associated with that portfolio with a relevancy weighting of 0.05. This relationship will be represented as an attribute of an edge between the portfolio and the topic in the final graph representation.

In various embodiments, each node representing a portfolio possesses an attribute which may be used to assess relative importance or to present the node within a visualization relative to other portfolios in the graph. For convenience, the total value of portfolio may be used. This value may be used to change the node within a visualization to vary based on style attributes such as color or size.

In various embodiments, each node representing a topic possesses an attribute which may be used to assess relative importance or to present the node within a visualization relative to other topics within a graph. The number of topic occurrences as a percentage of all topics over a selected time period may be used for this relative importance attribute.

In various embodiments, portfolios are represented as vertices or nodes with the following attributes: id, name, current value, and asset class, which is a list of asset classes and their weighted relevancy to the portfolio. Topics are represented as vertices or nodes with the following attributes: id, name. The importance attribute is generated based on a selected time-frame. The relationship of topics to portfolios are represented as directed edges with an attribute asset class, which is a list of the asset classes associated with the topic and company, which is a list of companies associated with a topic.

The classifications to be used within the knowledge web may be any type of classification that is used to describe, for example, both financial instruments and current or desired portfolio allocation. This allows for the association between topics generated from industry documents, classifications, and portfolios.

In various embodiments, just as the knowledge web provides a way to assess exposure, it may also be used to suggest trades that would lessen the exposure to specific topics. When a user requests to suggestions, the trade server 130 looks for available investment instruments within the same sector that appear to have a lower level of exposure to the topic. For example, the trade server 130 may suggest energy investments in a Scandavian country rather than a South American one based on the lack of negative exposure to energy crisis and Venezuala. The system does this by using the established relevancy scores combined with positive or negative sentiment. Trade suggestions are then compiled and offered for execution by linking to a trading system with the proposed sells and buys for the portfolio.

In various embodiments, a user may indicate an interest in receiving alerts when topics impacting their portfolio are trending as determined by the topic subsystem. They may do so from the topic sub-view, or when selecting the edge between a topic and portfolio.

In various embodiments, the association of topics with portfolios allows for assembling a regular digest of content (news, tweets, reports, etc.) associated with an individual's portfolio based on potential impact to the portfolio. User preferences allow for the specific sources of content to be selected and delivered during a desired time period (daily, weekly, monthly, etc).

Figure 9:
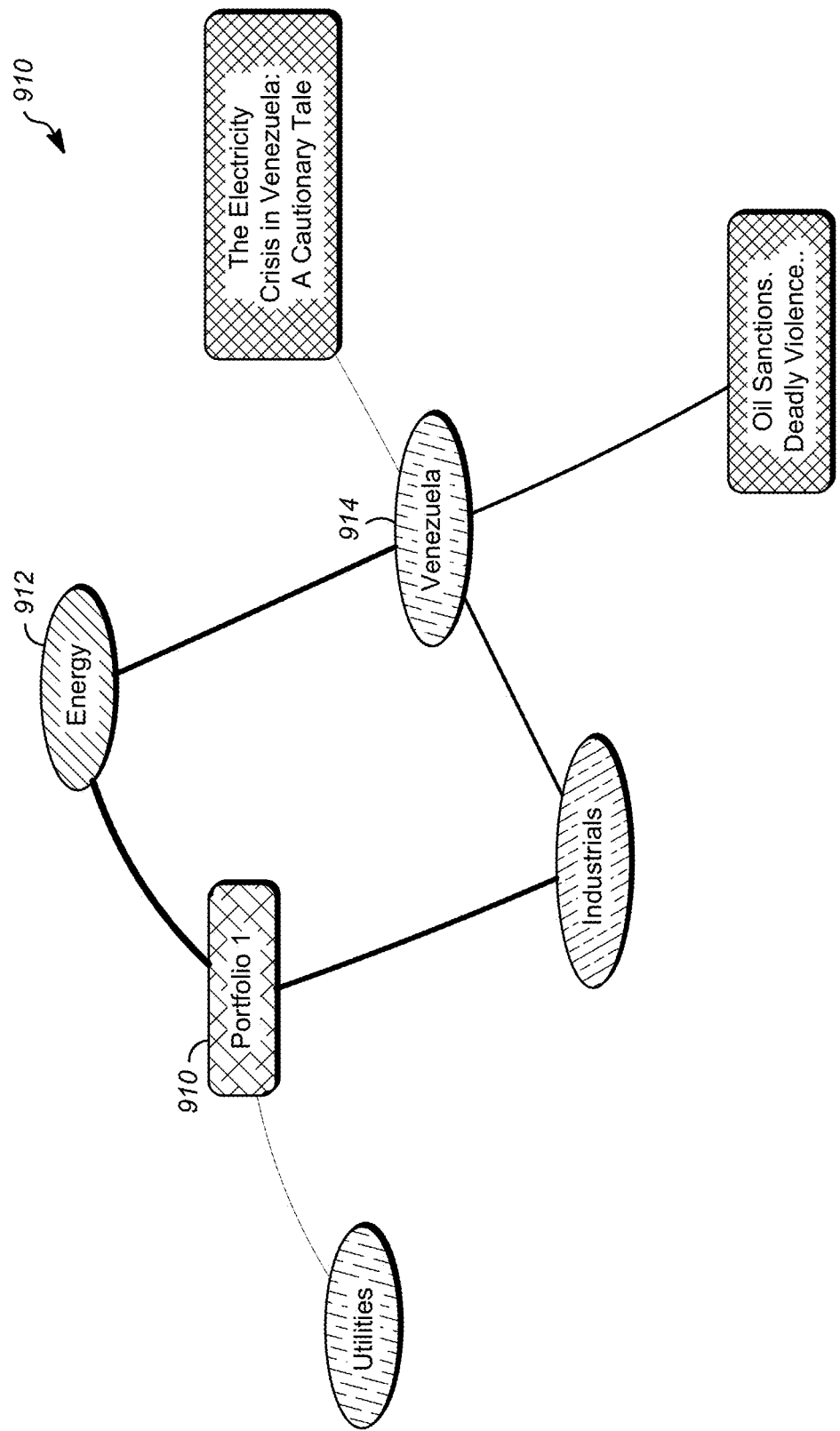
FIG. 9 is another example of an investor knowledge web arranged in accordance with the principles of the present disclosure.

After generating the knowledge web, different elements of the knowledge web are used to represent the relevancy and impact of the various relationships. For example, as shown in the knowledge web 910 of FIG. 9, if a portfolio 910 has significant exposure to the energy sector 912 and over a period of time the U.S. relationship with Venezuela 914 is discussed in a number of news articles and earnings reports, the edge 916 on the knowledge web 910 that connects energy 912 with the portfolio 910 would be thicker than the edge connecting other portfolios with less exposure to the Energy sector.

In various embodiments, when selecting nodes or edges of the knowledge web, additional information is made available to the user. By way of non-limiting example, if the user selects the energy sector, a summary of the important relationships and the most relevant news articles over the selected time period is presented. The user may further change the time period, entities used in the knowledge web, or set a threshold level of relevancy. This allows the user to customize the information being displayed by the knowledge web and further refine the content when an interesting topic is discovered.

Figure 10:
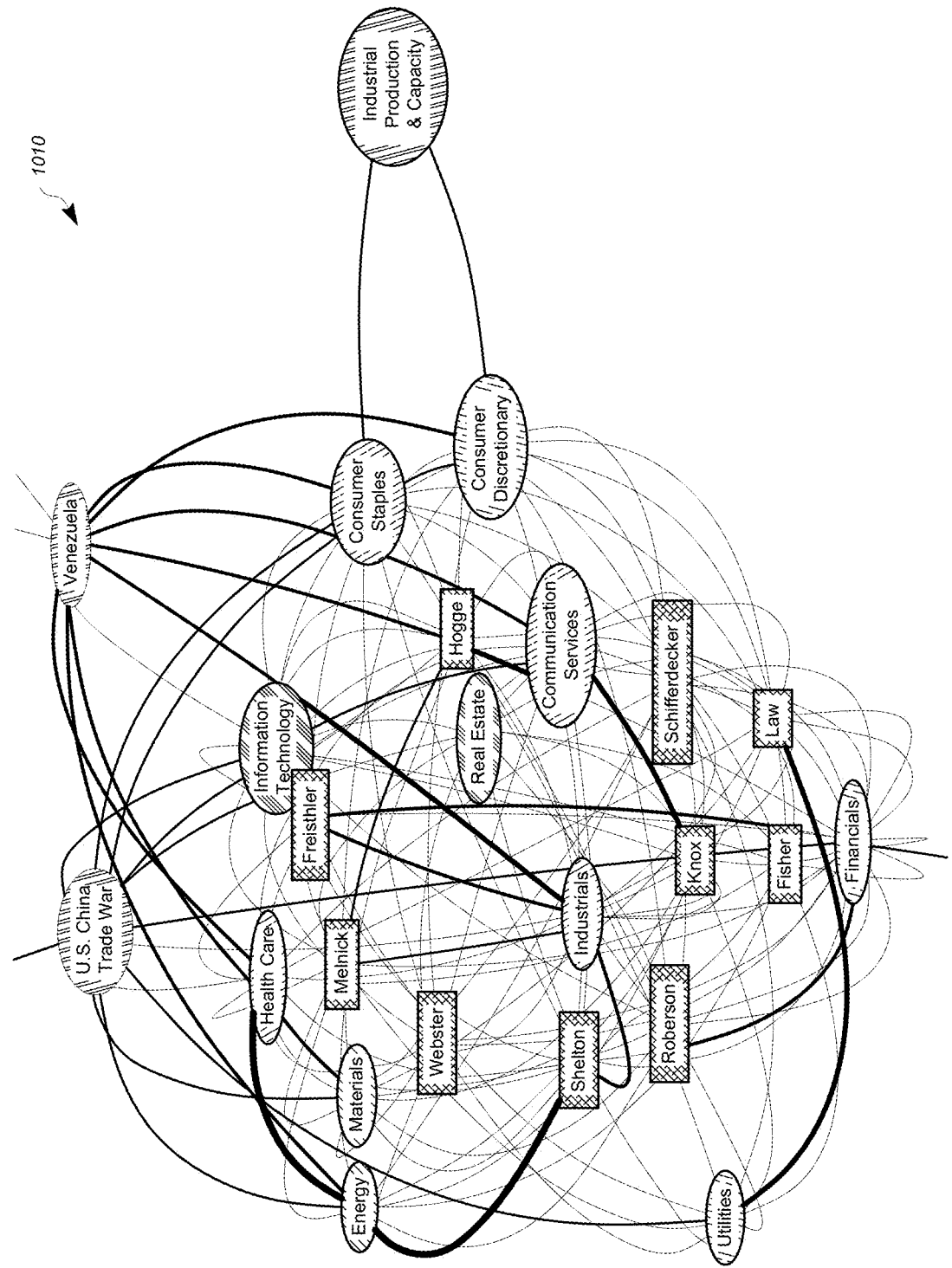
FIG. 10 is another example of an investor knowledge web arranged in accordance with the principles of the present disclosure.

In various embodiments, the knowledge web may also be used to illustrate a series of relationships when there are a number of topics, sectors, and portfolios. As shown in knowledge web 1010 of FIG. 10, the visual elements of the knowledge web are used to highlight relevancy. For example, the size or shape representing a portfolio may be adjusted based on total assets. Thickness of edges connecting nodes may be adjusted based on potential impact of one entity on another, such as, for example, a topic on an industry sector, or sector on a portfolio. The color of node may be used to highlight performance over time of a node. For example, if the timeline selected is the last six months, a sector's six month performance value would be used to change the color to a shade of green for positive performance or red for negative performance. The shades may vary relative to other nodes of the same type. For example, if the energy sector outperformed industrials over the six month period, but both were positive, the node for energy would be a brighter shade of green.

The investor knowledge web may be provided to users as a standalone product through a web portal, an application, or as a part of a larger product offering. For example, a financial advisor may use the investor knowledge web to create a narrative around their client portfolios over a time period in order to help explain those events that most impacted the portfolio's performance and provide a foundation for discussing changes based on likely future events.

An individual client or investor may be provided with a mechanism to quickly assess their exposure within certain categories of investment and relate that exposure to events that have taken place. This information could be used to make adjustments to their portfolio's allocations to limit their future exposure. From the knowledge web view, a user would also be able to identify those topics for which they would like to receive notifications regarding future documents (news, reports) that are relevant to portfolios they are managing. These notifications could come as email alerts or mobile push notifications. For example, the user could configure the knowledge web so that they are notified any time the content of the knowledge web changes, when a specific sector or branch is altered, or when a bubble above a threshold level of relevancy is added to the knowledge web.

Figure 11:
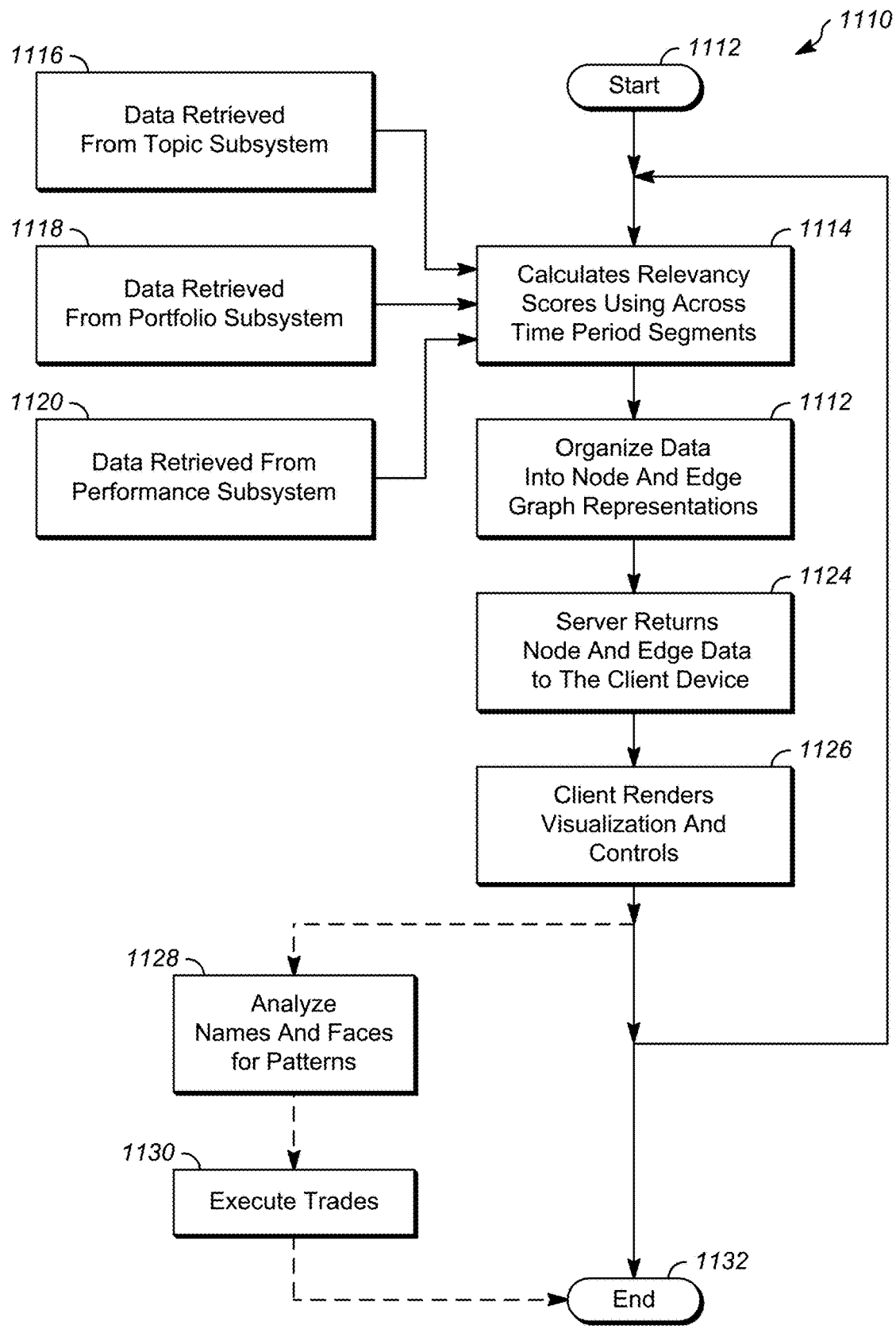
FIG. 11 is a flowchart of an example operation performed by an implementation of the investor knowledge web system.

FIG. 11 depicts a flow chart 1110 detailing one example of operation of the knowledge web system of FIGS. 1-10. Control begins at block 1112 and proceeds to block 1114. Block 1114 determines relevancy scores using a cross time period segments. The relevancy scores are determined in accordance with data received from topic subsystem module 110, data received from portfolio subsystem module 112, in data received from performance subsystem module 112. As shown at block 1116 of FIG. 11, data is received from topic subsystem module 110 and input to block 1114. Similarly, as shown at block 1118, data received from portfolio subsystem module 112 and input to block 1114. Likewise, as shown at block 1120, data is retrieved from performance subsystem module 112 and input to block 1114. By way of non-limiting example, determining the relevancy scores a cross time segments at block 1114 may be effected at relevancy accessor module 122 of server 120 of FIG. 1.

Control then proceeds to block 1122, which receives the relevancy scores from block 1114, and organizes data into node and edge graph representations. The node and edge graph representations are organized into serialized data and output to block 1124. Block 1124 receives the serialized data and returns node and edge data to the client device. The node and edge data is output to block 1126. At block 1126, data output by block 1124 to a respective client device, such as client 104a, 104b, is returned for display on respective client device 102a, 102b. At block 1126, the client 104a, 104b renders visualization and controls for manipulation by a user interface of the knowledge web system such as client device 102a, 102b.

In various embodiments, control proceeds to block 1128 which analyzes nodes and edges for patterns in order to determine trade recommendations and or trades. Control then proceeds to block 1130 at which the respective trades are executed via tradeserver 130 of FIG. 1. Control ends at block 1132. It should be noted that blocks 1128 and 1130 represent optional steps in flow chart 1110.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a topic subsystem module, the topic subsystem module configured to acquire and store artifact data relative to a first predetermined period having a first start and a first end defined by a user, the topic subsystem module extracting topics related to preselected data;
a portfolio subsystem module, the portfolio subsystem module configured to store data regarding asset positions in a financial portfolio and the performance of each position over a second predetermined period having a second start and a second end defined by the user;
a performance subsystem module, the performance subsystem module configured to generate performance metrics for aggregate categories over a third predetermined period having a third start and a third end defined by the user;
a server, the server configured to receive data from the topic subsystem module, the portfolio subsystem module, and the performance subsystem module, the server generating relevancy relationships between the respective artifact data, asset positions, and performance metrics; and
a client device, the client configured to receive the relevancy data and display on a graphical user interface a knowledge web relating individual components of the relevancy data,
wherein at least two of the first predetermined time period, the second predetermined time period, and the third predetermined time period are different, and
wherein the knowledge web includes a plurality of nodes, and the plurality of nodes includes at least a plurality of portfolios, sectors, topics, and news, and selected ones of the plurality of nodes are interconnected to selected others of the plurality of nodes.

2. The system of claim 1 further comprising a trade server, the trade server configured to execute respective trades based on the knowledge web.

3. The system of claim 1 wherein the nodes vary in at least one of size, shape, color, line thickness, or distance from another node to indicate a strength of connection between the selected ones of the plurality of nodes.

4. The system of claim 3 wherein a first size indicates a strength of connection between the selected ones of the plurality of nodes and a second size indicates a different strength of connection between the selected ones of the plurality of nodes.

5. The system of claim 3 wherein a first color indicates a strength of connection between the selected ones of the plurality of nodes and a second color indicates a different strength of connection between the selected ones of the plurality of nodes.

6. The system of claim 3 wherein a first shape indicates a strength of connection between the selected ones of the plurality of nodes and a second shape indicates a different strength of connection between the selected ones of the plurality of nodes.

7. The system of claim 3 wherein a first line thickness indicates a strength of connection between the selected ones of the plurality of nodes and a second line thickness and indicates a different strength of connection between the selected ones of the plurality of nodes.

8. The system of claim 3 wherein a first distance between the selected ones of the plurality of nodes indicates a strength of connection between the selected ones of the plurality of nodes and a second distance between the selected ones of the correlative nodes and indicates a different strength of connection between the selected ones of the plurality of nodes.

9. The system of claim 1 wherein the knowledge web is displayed in a first frame on the graphical user interface and a first filter selection portion is displayed on the graphical user interface, wherein the first filter selection enables selection of one of a relevancy or a date for the at least a plurality of portfolios, sectors, topics, and news.

10. The system of claim 9 wherein a second filter selection portion is displayed on the graphical user interface, wherein the second filter selection enables selection of the other of a relevancy or a date for the at least a plurality of portfolios, sectors, topics, and news.

11. The system of claim 1 wherein the knowledge web is displayed in a first frame on the graphical user interface and an information selection portion is displayed on the graphical user interface, wherein the information selection provides additional information the at least a the plurality of portfolios, sectors, topics, and news.

12. A method comprising:
acquiring and storing artifact data relative to a first predetermined period, and extracting topics related to preselected data;
storing data regarding asset positions in a financial portfolio and the performance of each position over a second predetermined period;
generating performance metrics for aggregate categories over a third predetermined time frame;
receiving the artifact data over a first predetermined time period having a first start and a first end defined by a user, the asset positions data over a second predetermined time period having a second start and a second end defined by the user, and the performance metrics over a third predetermined time period having a third start and a third end defined by the user and generating relevancy relationships between the respective artifact data, asset position data, and performance metrics; and
receiving the relevancy data and displaying on a graphical user interface a knowledge web relating individual components of the relevancy data,
wherein at least two of the first predetermined time period, the second predetermined time period, and the third predetermined time period are different, and
wherein the knowledge web includes a plurality of nodes, and the plurality of nodes includes at least a plurality of portfolios, sectors, topics, and news, and selected ones of the plurality of nodes are interconnected to selected others of the plurality of nodes.

13. The method of claim 12 further comprising executing trades in accordance with the knowledge web.

14. The method of claim 12 wherein the nodes vary in at least one of size, shape, color, line thickness, or distance from another node to indicate a strength of connection between the selected ones of the plurality of nodes.

15. The method of claim 14 wherein a first size indicates a strength of connection between the selected ones of the plurality of nodes and a second size indicates a different strength of connection between the selected ones of the plurality of nodes.

16. The method of claim 14 wherein a first color indicates a strength of connection between the selected ones of the plurality of nodes and a second color indicates a different strength of connection between the selected ones of the plurality of nodes.

17. The method of claim 14 wherein a first shape indicates a strength of connection between the selected ones of the plurality of nodes and a second shape indicates a different strength of connection between the selected ones of the plurality of nodes.

18. The method of claim 14 wherein a first line thickness indicates a strength of connection between the selected ones of the plurality of nodes and a second line thickness and indicates a different strength of connection between the selected ones of the plurality of nodes.

19. The method of claim 14 wherein a first distance between the selected ones of the plurality of nodes indicates a strength of connection between the selected ones of the plurality of nodes and a second distance between the selected ones of the correlative nodes and indicates a different strength of connection between the selected ones of the plurality of nodes.

20. The method of claim 12 wherein the knowledge web is displayed in a first frame on the graphical user interface and a first filter selection portion is displayed on the graphical user interface, wherein the first filter selection enables selection of one of a relevancy or a date for the at least a plurality of portfolios, sectors, topics, and news.

21. The method of claim 20 wherein a second filter selection portion is displayed on the graphical user interface, wherein the second filter selection enables selection of the other of a relevancy or a date for the at least a plurality of portfolios, sectors, topics, and news.

22. The method of claim 12 wherein the knowledge web is displayed in a first frame on the graphical user interface and an information selection portion is displayed on the graphical user interface, wherein the information selection provides additional information the at least a the plurality of portfolios, sectors, topics, and news.

* * * * *